CONTROLLED BANDWIDTH CODED VOICE COMMUNICATION SYSTEM

Filed Jan. 24, 1964

3 Sheets-Sheet 1

INVENTOR.
DAVID M. STERN

CONTROLLED BANDWIDTH CODED VOICE COMMUNICATION SYSTEM

Filed Jan. 24, 1964

3 Sheets-Sheet 2

United States Patent Office 3,341,659

Patented Sept. 12, 1967

3,341,659

CONTROLLED BANDWIDTH CODED VOICE COMMUNICATION SYSTEM

David M. Stern, Merion Station, Pa., assignor to Burroughs Corporation, Detroit, Mich., a corporation of Michigan Filed Jan. 24, 1964, Ser. No. 340,020

9 Claims. (Cl. 179—1.5)

ABSTRACT OF THE DISCLOSURE

A system of coding and decoding a voice signal in a communication channel in which the frequency spectrum of the coding signal is automatically controlled by the frequency to the voice signal such as to maintain the resulting signal modulation products within the prescribed channel bandwidth. This is accomplished by code modulating a voice signal with a composite wave form generated by summing a plurality of square waves; the square wave generators are individually activated or de-activated responsive to the output bandwidth.

The present invention relates to coded voice communication systems, and more particularly it relates to a coded voice communication system requiring less channel bandwidth than existing coded voice systems.

The coding system proposed herein provides a bandwidth controlling means which is inherent to and dynamically operated by the voice coding mechanism.

The saving in bandwidth of the present system over the usual voice coded system is such that the bandwidth required is only slightly greater than that required for uncoded voice transmission.

The actual amount of bandwidth saved, however, is dependent upon the lower frequency limit of the transmission channel to be used. For example, if the range of voice frequencies to be transmitted is assumed to be from 300 cycles to 2.2 kilocycles per second, a transmission channel bandwidth from 0 to 2.7 kilocycles would be sufficient using the present system. However, as a practical matter, transmission channels do not extend down to zero cycles, and if the transmission channel to be used had a lower limit cutoff frequency of 300 cycles per second rather than 0, the bandwidth required would increase approximately 600 cycles.

The present system achieves this saving in bandwidth through the use of a novel feedback arrangement in both the encoder and decoder portions. In the encoder, the coding signal is multiplied by the uncoded voice input signal to the modulator input. The code generator, in turn, is controlled by a feedback loop signal from the encoded voice output signal from the modulator. A similar arrangement in the decoder enables a simple recovery of the encoded signal. Synchronism, within the system, is accomplished by central control of the code generators.

It is, therefore, a prime object of this invention to provide a coded voice communication system having reduced channel bandwidth requirements.

It is a further object of this invention to provide a coded voice communication system which achieves this bandwith reduction through the use of a coded information feedback loop to control the code generator signal modulating the input voice signal.

It is a still further object of the present invention to provide a coded voice communication system having a transmitting and receiving means, both of which have modulation devices with coded information dependent feedback loops controlling the code generator input signal to the modulator.

It is a still further object of this invention to provide a coded voice communication system wherein the code signal is an analog representation of a digitally derived code signal.

It is a still further object of this invention to provide a coded voice communication system wherein the degree of coding is functionally dependent upon the information voice frequency.

It is a still further object of the present invention to provide a coded voice communication system wherein the generated code signal is the signal summation of the output signals of a plurality of digital counting means in which the plurality of output signals is determined by the coded information signal frequency content.

Various other objects and advantages will appear in the following description of preferred embodiments of the invention and the novel features will be particularly pointed out hereinafter in connection with the appended claims.

Briefly, however, the communication system presented herein provides a means and a method for the secure coding of voice signals. The system requires a transmission channel bandwidth only slightly greater than that required for uncoded voice transmission. As will be seen, this is a considerable reduction from the channel bandwidth previously required for coded voice transmission. The improvement in bandwith is accomplished by making the coding signal functionally dependent upon the information or voice signal in a manner which allows for decoding simplicity.

The invention itself, however, both as to organization and method of operation, together with further objects and advantages, may best be understood by reference to the drawings wherein.

The coding system used here utilizes a pre-arranged serial code which is multiplied by the incoming voice signal to produce a resulting "scramble." It is well known that this multiplication results in sum and difference frequency components which, in general, will smear the signal product over a frequency band which extends considerably above and below that of the original signal.

For example, a coding frequency may be specified as a repetitive square wave of up to 1000 pulses per second. It is well known that such a complex wave may be represented by the sum of a number of sine waves of different frequencies. As an equation, this theoretical statement takes the following form and is known as a Fourier series:

$$(1)\quad y=f(x)=A_0+A_1 \sin x+B_1 \cos x +A_2 \sin 2x+B_2 \cos 2x+A_3 \sin 3x +B_3 \cos 3x+ \ldots +A_n \sin nx+B_n \cos nx$$

While an infinite number of components may be required, for an exact representation, in a practical case only a few terms are necessary because of the relatively small effect of the terms of the higher frequency.

In the special case of a rectangular wave, the Fourier equation is well known to contain only odd harmonics.

(2) $y=A_1 \sin \omega t+A_1/3 \sin 3\omega t+A_1/5 \sin 5\omega t \ldots$ etc.

where $A_1=4/\pi$ times the amplitude of the rectangular wave.

A fair approximation of any rectangular wave is achieved by adding the first, third and fifth harmonic terms, ignoring those higher harmonic terms which extend to infinity.

From elementary modulation theory it is known that multiplication of any signal by a complex wave results in signal products which are the sum and difference of each of the individual sine waves of the complex signal and the signal itself. Thus, a complex rectangular wave having a repetition rate of 1000 p.p.s. contains sine waves of odd harmonics from the fundamental out to infinity. Numerically, these sine wave signals are 1000 c.p.s., 3000 c.p.s., 5000 c.p.s. . . . etc. Modulation products resulting from the multiplication of such a rectangular wave by a voice signal would therefore include the sum and difference signals of each of these harmonics and the voice signal.

Based on the knowledge that the important frequency components of speech lie in discrete, slowly (syllabic rate) varying, frequency bands, the coding signal may be varied in a way to successively reduce its high frequency components until the resultant product has all of its upper frequency components lying within the transmission capabilities of a communication channel considerably more narrow than that required prior to such high frequency component reduction. A basic block diagram illustrating such a system is shown in FIG. 1.

Figures 1, 2:
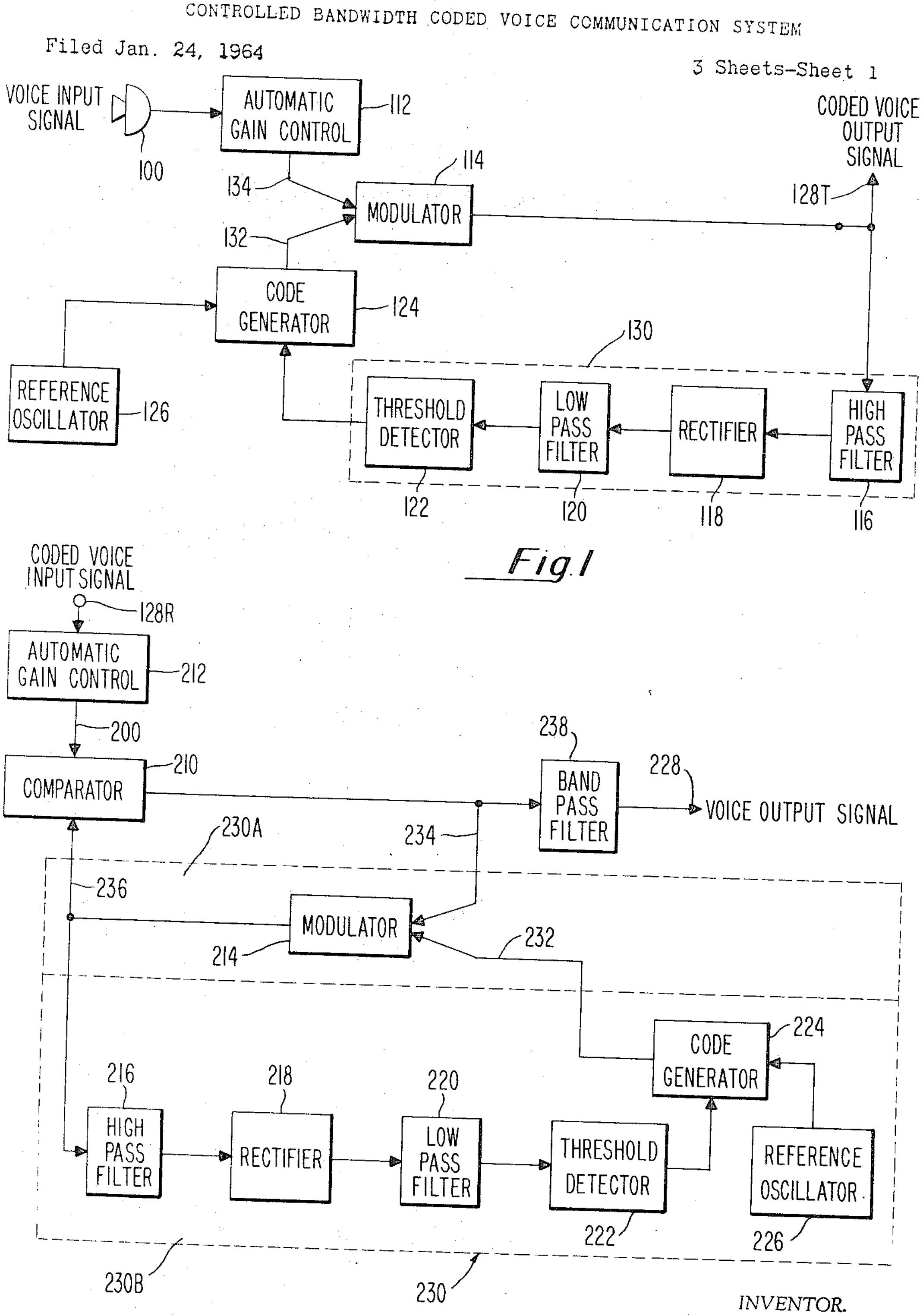
FIG. 1 is a block diagram of the basic encoding device of the communication system.
FIG. 2 is a block diagram of the basic decoding device of such a system.

In FIG. 1 the synchronized code generator 124 has an analog output signal 132 with an average frequency spectrum similar to that of the voice signal 134. The analog code signal 132 is multiplied in the modulator 114 by the voice signal 134 and the resultant modulated product represents the basic coded output signal 128. The modulator signal output 128, however, is continuously monitored by a high pass filter-threshrold detector feedback loop 130, and whenever this loop 130 senses frequency components in the output signal 128 which are too high, i.e., within the range of the high pass filter, it acts on the code generator 124 to temporarily reduce the higher frequency components in its output 132.

In the receiver, shown in FIG. 2, the voice signal 228 is recovered by dividing out the prearranged encoded signal from the received "scramble" signal 128R. The appropriate code signal 232 is provided by the code generator 224 in the basic encoder which is maintained in strict synchromism with the encoding code generator 124 of FIGURE 1. The division is accomplished by multiplying this synchronized code signal 232 by the comparator output signal 234 in a feedback loop 230 to supply a code modulated voice product 236 which corresponds to the scrambled received signal 200 which, as stated previously, is just such a product. As shown in the basic block diagram of the decoder in FIGURE 2, the comparator 210 continuously compares the modulator output with the coded input and generates 234, a difference signal. This signal 234 is applied to the modulator 214, that, in turn, produces the signal 236 by multiplying it and the coded input 232. At the same time the high pass filter threshold-detector feedback loop 230B is also monitoring the output of the modulator 214 in a manner analogous to the action of the similar feedback loop 130 in the transmitter of FIG. 1. And again this feedback loop 230B acts on the code generator 224 to reduce the high frequency components of its output 232 whenever the modulator output 236 exceeds the limit of its frequency band. The comparator feedback loop 230A and the code generator feedback 230B systems have a response which is fast enough to allow them to respond completely to all changes in the coded input signal 200.

The resulting output signal 234 from the comparator 210 is a replica of the voice input signal 100 that had been applied to the transmitter encoder.

A basic system composed of the encoder and decoder of FIGURES 1 and 2 then allows the secure coding of voice while maintaining close control on the upper frequency excursions of the coded signal. However, no control can be maintained on the lower frequency limit, and frequency components down to zero cycles per second will be produced by the modulation process. As a practical matter the typical communication channel will not be able to accommodate the very low frequencies and yet the demodulating process insists that they be maintained.

Figures 3, 4:
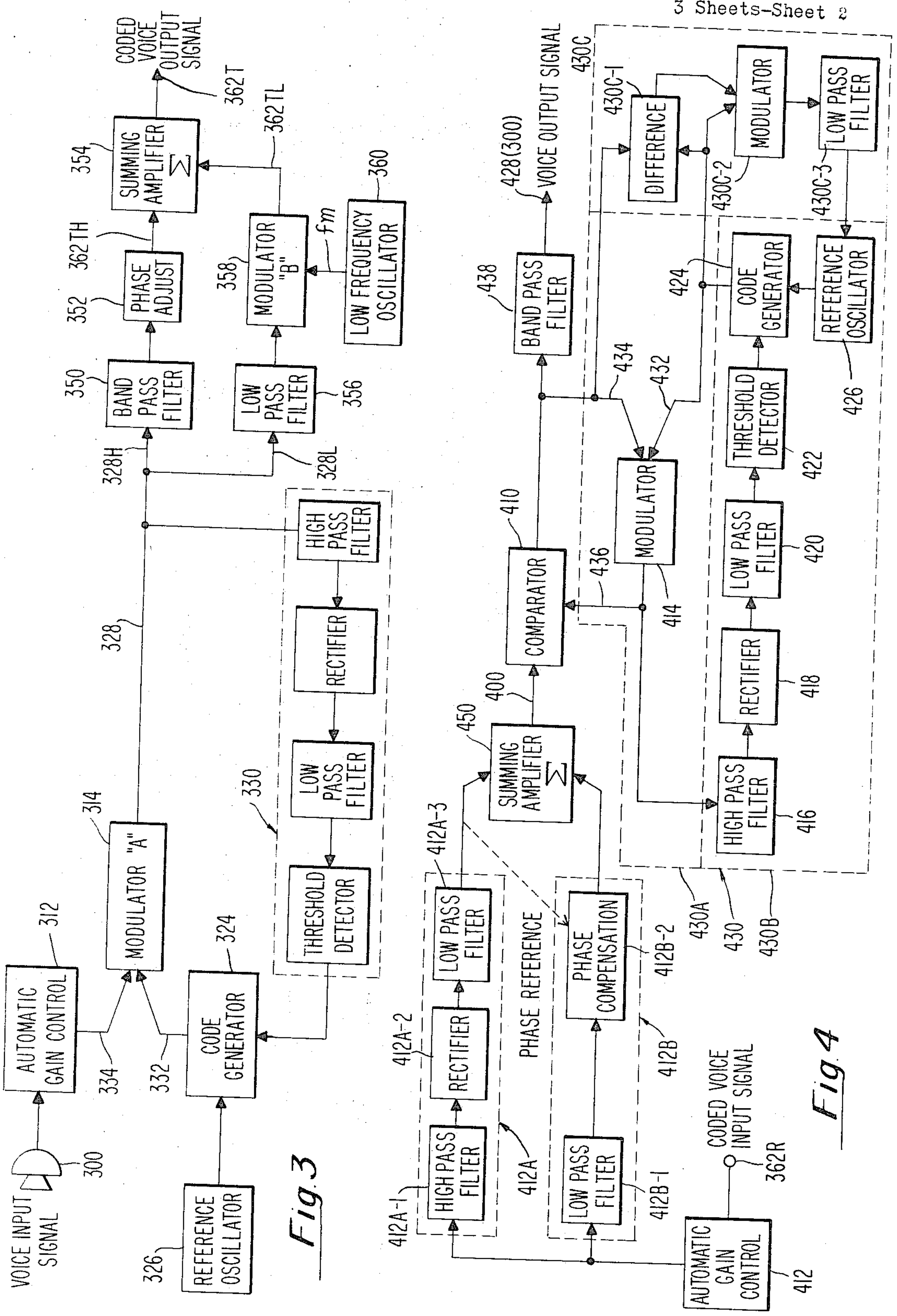
FIG. 3 is a block diagram of the complete encoding device as would be used in a preferred embodiment of the envisioned system.
FIG. 4 is a block diagram of the complete decoding device to complete the envisioned system of FIG. 3.

As shown in FIGURE 3, the solution to this low frequency cutoff problem is obtained by separating the very low frequency components 328L from the rest of the signal output 328 from the basic encoder. The remaining upper portion of the coded signal 328H may be conveniently transmitted in its present form. The low frequency signals 328L are separated by low pass filter 356, multiplied in modulator 358 by a low frequency signal ($f_m$) from a suitable oscillator 360, and finally linearly added by amplifier 354 to the upper portion of the coded signal 362TH. The resultant sum signal 362T may then be conveniently transmitted. The low frequency $f_m$ of the oscillator 360 must be chosen high enough to keep the lower frequency components of the "B" modulator 358 output signal 362TH above the band of frequencies occupied by the output signals 328 of "A" modulator, and yet low enough to keep the upper portion frequencies 362TH from "B" modulator 358 within the frequency band covered by the communication channel. It is seen that the inability of the communication channel to pass very low frequencies requires an increase in the limit upper frequency of used bandwidth. The bandwidth increase is not, as might be expected, merely by an amount double the low cutoff frequency of the channel, but, by that amount plus an additional increment to provide for a guard slot between the modulator "B" frequency components 362TL and the rest of the signal 362TH. However, while the bandwidth penalty is appreciable it is still much less than would be encountered if the whole coded signal 328 from modulator "A" were shifted up in frequency through another modulation process.

To accommodate the band limiting encoder of FIG. 3, the decoder of FIG. 2 must also be modified. The block diagram of the modified band limited voice decoder is shown in FIG. 4. The phase compensation network 412B–2 is inserted in the input low pass filter branch 412B to compensate for any differential time delay which may occur in the course of transmission or in the input filtering. An additional refinement which may be preferred in the decoder is the phase adjustment loop 430C enclosed by a rectangle of dash lines in the lower right side of FIGURE 4. If the transmitter and receiver code generators 324 and 424, respectively, are not in perfect phase, some of the code signal will be present in the output of the comparator 434 (since the division process will not have resulted in complete cancellation of the code) and this presence is indicated by the generation of a DC component when this signal is multiplied in modulator 430C–2 by the code generator signal 432. The polarity of this DC component, which specifies a leading or a lagging phase relationship, is determined by subtractor or difference circuit 430C–1. It thereby compensates accordingly the frequency of reference oscillator 426 to create phase correspondence between the code generators of the encoder and decoder.

The remainder of the decoder of FIGURE 4 is operationally identical to the basic decoder of FIGURE 2. In short, the coded voice signal 362R, the lower portion of which has been frequency shifted, is received into the automatic gain control circuit 412. Its portions are separated and temporarily follow different paths. One path carries the frequency shifted portion of the signal and is referred to in FIGURE 4 as 412A. The other path 412B carries the original unshifted portion. Low pass filter 412B–1 blocks the passage of the shifted portion of the signal, allowing only the unshifted lower frequency portion through. High pass filter 412A–1 passes the shifted portion of the signal to rectifier 412A–2, which detects the coded voice signal modulation from the oscillator frequency $f_m$. The low pass filter 412A–3 passes only the coded voice signal.

As previously mentioned, the phase compensation circuit 412B–2 couples the output signal from low pass filter 412B–1 to the summing amplifier 450. It provides any delay necessary to insure an "in phase" relationship between the signal applied to the amplifier 450. The dotted line indicated "phase reference" merely notes the phase relationship between the signals to be added.

The summing amplifier 450 linearly adds both branches of the received voice encoded signals to thereby relocate the low frequency portion which had been frequency shifted by the oscillator of the voice signal.

Comparator 410 basically performs the demodulation process. It receives the restored signal 400, which at this point is an encoded voice signal, and compares it with the output signal 436 from modulator 414. The signal 436 is a feedback signal from the output of the compartor which has been synchronously encoded by the receiver, with the same code as the transmitted signal.

A closer look may clarify this demodulation process. If the decoder of FIGURE 4 is considered separately, it is seen that the dash enclosed rectangle 430 in the lower right hand side comprises three subsections referenced as 430A, 430B, and 430C. Enclosed in section 430A is the modulator 414 which is identical to the modulator "A" referenced as 314 in the FIGURE 3 encoder. Further, the feedback circuitry and code generator, enclosed in 430B, are identical to the feedback circuitry and code generator of the encoder. It is seen, therefore, that the circuitry used to encode the signal in the FIG. 3 encoder is present in the decoder as a feedback loop between the output signal 434 and one of the input signals 436 of the comparator 410.

The comparator 410 operates to create as an output signal 434, the difference signal resulting from a comparison of its input signals 400 and 436.

Thus, where identical signals are applied to its inputs, the comparator output is zero. If it is initially assumed that the input signals to the comparator have just started and as yet no comparison has been made and consequently no output exists, then the only signal to the comparator is from modulator 414 which is the coded signal from code generator 424. The other comparator input signal 400 is the coded speech signal which is desired to be demodulated. The comparison, therefore, is between a coded voice signal 400 and a code signal 436. The comparator 410 continuously examines the modulator output signal 436 and the coded input signal 400. It then generates a signal 434 which is applied to the modulator 414 that minimizes the difference between the coded input signal 400 and the modulator output signal 436. This minimized signal approximates the initial voice input signal 300 shown in FIGURE 3. A code feedback loop, including a high pass filter 416, rectifier 418, low pass filter 420, and threshold detector 422, monitors the signal products from modulator 414. Products which exceed the channel bandwidth are eliminated by controlling the output coding signal components of the code generator 424. The resulting decoder encoded voice signal 436 is therefore bandwidth limited in the decoder exactly as the coded voice signal 400 was in the encoder.

The signals 400 and 436 each includes a coded signal portion which tends to cancel each other to provide a difference voltage 434 approximately zero. However, the reduction of signal output at 434 immediately reduces its contributing signal to the modulator 414. The remaining code signal to the comparator causes a recycling to occur which generates a voice output signal from the comparator 410, whereby the entire process is repeated. This self-controlled repetitive recycling results in an apparent state of equilibrium much like the operation of a high gain operational amplifier wherein an output voltage exists despite what appears to be virtually zero volts at the input terminals.

In the present circuit, then, the presence of a voice signal at the output of the comparator thereafter causes its cancellation at one of the comparator's inputs. The absence of a voice signal at the comparator output caused by this cancellation thereafter causes its restoration at the output of the comparator. The result is a state of equilibrium causing the continued presence of a voice modulated signal at 434. This decoded signal is coupled through band pass filter 438 to remove any residual noise and produce a voice output signal 428 approximately the applied speech input signal to the system.

Figure 5:
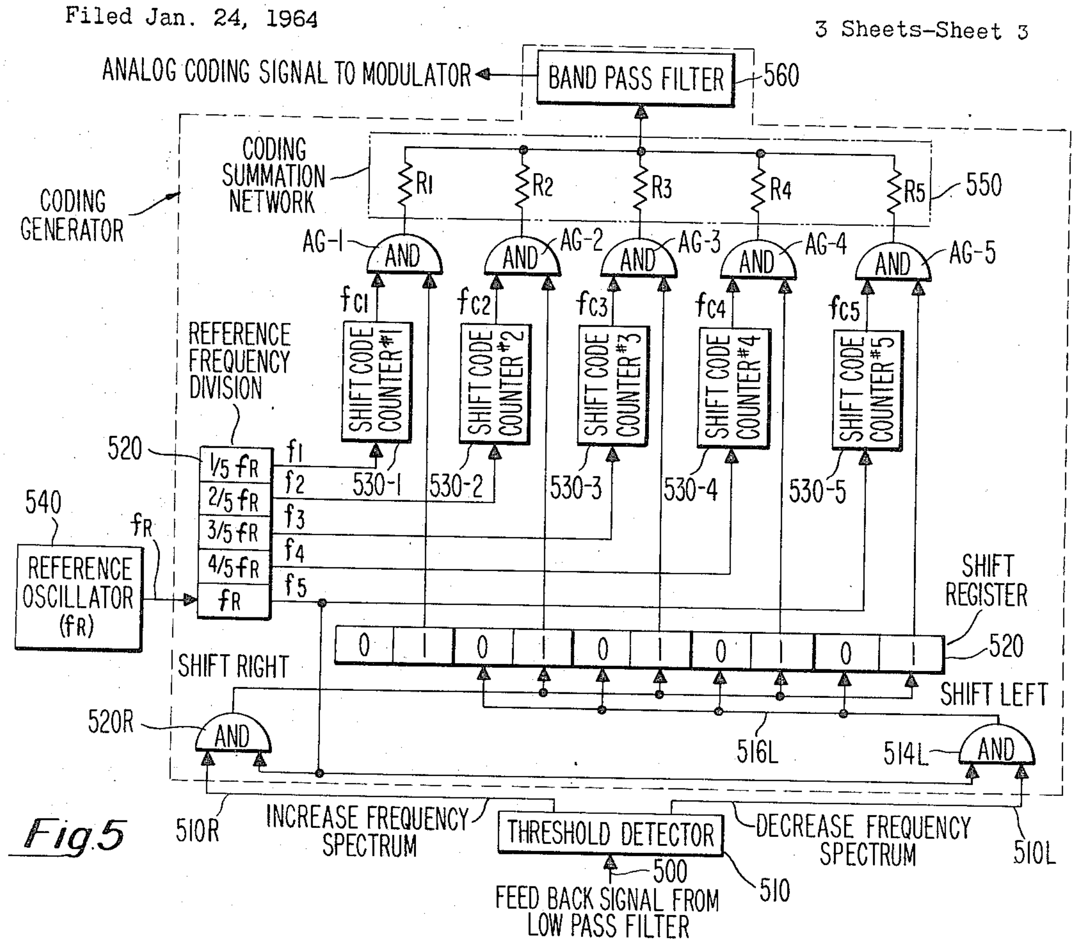
FIG. 5 is a detailed block diagram of the code generator as used in the encoding device of FIG. 3.

A block diagram of an embodiment of the code generator is shown in FIGURE 5. A number of shift code counters—five are shown for purposes of illustration—530–1, 530–2, 530–3, 530–4 and 530–5, are operated under the control of an equal number of clock or reference oscillator signals. Each code counter generates a predetermined coded output signal. The oscillator timing signals are inherently synchronized with each other, the lower signals being subdivisions of a reference frequency from oscillator 540. Thus, if the reference oscillator frequency is denoted as $f_r$, the lower ones are $\frac{4}{5}f_r$, $\frac{3}{5}f_r$, $\frac{2}{5}f_r$ and $\frac{1}{5}f_r$. The clock frequencies have been respectively referenced $f_5$, $f_4$, $f_3$, $f_2$ and $f_1$, the reference oscillator frequency $f_r$ corresponding to $f_5$, and connected to their respectively-numbered shift code counters, i.e., counter 530–1 connected to receive clock frequency $f_1$. The coded output signal from each of the code counters is respectively numbered in a corresponding order. Thus, coded signal $fc_1$ emanates from code counter 530–1.

The code counters 530–1 to 530–5 are identical in operation and design, each having its predetermined coding sequence. The counters are operated at progressively higher repetition rates corresponding to their respective oscillator control frequency. The output signal from each counter $fc_1$ to $fc_5$ is a serial digital signal which is filtered to produce an analog waveform representative of the digital signal. The filtering is arranged to extract only the "fundamental" frequency component of each of the counter output signals. The miscellaneous harmonics associated with the "rise time" of the counter digital signal are therefore ignored to consequently reduce the modulation products which would result from such harmonics. It is clear that each of these "fundamental" frequency components has a maximum frequency one half that of the clock rate frequency driving the counter and is generated by a 101010 . . . output pattern. All other output patterns from any counter can only result in coding waveforms with lower frequency components. Thus, the maximum frequency component in the coding waveform is limited by controlling the maximum rate at which the counter is allowed to operate. This fixed rate/frequency relationship suggests a shift code counter for a band limited frequency application where the rate of the shifting is controlled by the frequency characteristic of the resultant coded signal. This would result in limiting the upper frequency of the coded signal, as does the present system, but it would not resutl in a signal which would be readily decoded.

As indicated previously, the basic coding waveform is generated internally within a plurality of shift code counters which run continuously under the synchronous control of the reference oscillator. Their coded output signals are summed in a simple resistor network 550. This, incidentally, allows for the possibility of differential weighting of the various counter output signals. The band limiting control is accomplished through the AND gates AG1 through AG5 on the shift code counter outputs $fc_1$ to $fc_5$ and shift register 520.

The summation of these coded signals by resistors R1, R2, R3, R4 and R5 of resistor network 550 is coupled to band pass filter 560 wherein the "fundamentals" frequency of each of the digitally coded signals is retrieved from the remainder of its harmonics.

Figure 6:
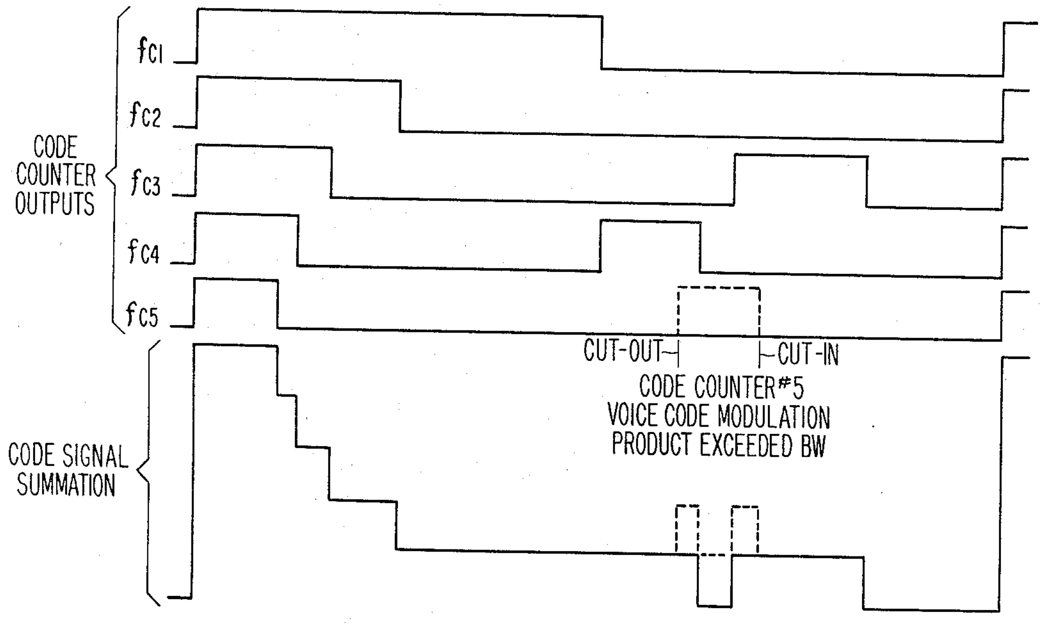
FIG. 6 is a timing diagram of the coding generator to illustrate the counting signal summation operation wherein the coding variation is created.

FIGURE 6 is a graphical representation of the individual waveforms from the code counters into the resistive network 550 and the composite signal out of the same network. The coded output signals $fc_1$ through $fc_5$ are placed in descending order, along a common time base, from the top of the FIGURE 6. Thus, the signal $fc_2$ is shown as having twice the pulse rate of $fc_1$. Signals $fc_3$, $fc_4$ and $fc_5$ have respective rates which are three, four and five times faster than signal $fc_1$. Absence of certain pulses in each of the pulse signals is a consequence of the coding within the respective counter.

The waveform at the bottom of FIGURE 6 indicated as the summation signal has an amplitude corresponding to the combined amplitudes of the individual code signals present at a particular time. The dotted portion of waveform $fc_5$ illustrates the operation of the bandwidth limiting feature of the present invention. At the point in time marked "cut-out" on the $fc_5$ waveform, a signal product resulting from the multiplication of the summation coding signal by the speech signal to be encoded has exceeded the limit frequency of the predetermined bandwidth.

As previously discussed, this attempt to exceed the prescribed bandwidth limit causes termination of certain of the shift code counter signals. Since the termination and activation of the counters follows a sequence based on operational speed, the termination signal disables the active AND gates associated with the fastest shift code counter. In FIGURE 6, the presence of the coded signal $fc_5$ indicates the activation of AND gate AG5. Thus, the AND gate to be initially disabled is AG5. The notation "cut-out" indicates the termination of the signal contribution made by the output signal of counter 520–5 from the summation signal.

The solid line of the summation waveform indicates the signal as it appears in the absence of the counter 520–5 output signal. The dashed line on the summation curve corresponds to the dashed line on the waveform of coded signal $fc_5$ and illustrates the summation curve as it would be were the $fc_5$ coded signal included. If it becomes desirable to further reduce the frequency content of the coding summation signal, output signals of the slower counters are progressively "cut-out" until the desired frequency band reduction has taken place. Alternately, when the threshold detector indicates that the coded signal is within its bandwidth limitations, the output signals of the higher frequency shift code counters are progressively cut-in to allow the maximum amount of scrambling to take place. The notation "cut-in" on the waveform of counter output signal $fc_5$ is indicative of this alternate condition.

In the system described, each of the shift code counters of FIGURE 5 is counting under the control of its respective clock signals having progressively higher rates, up to a maximum clock rate of the reference oscillator frequency, $f_r$, which in the present embodiment is approximately 4 kilocycles per second. The shift register 520 is presumed to have five binary positions, all of which are initially loaded with binary ONES, each of which thereby respectively enables AND gates AG1, 2, 3, 4 and 5. The threshold detector 510 is in its frequency spectrum-decreasing state in response to a "bandwidth exceeded" indication by feedback signal 500. This spectrum-decreasing state of threshold detector 510 causes its shift-left control line 510L to enable AND gate 514L. Thereafter, each clock pulse of $f_5$ will open AND gate 514L and cause a stream of ONES to flow along the left shift line 516L, and consequently right to left along shift register 520, each shift closing another AND gate, AG5, AG4 . . . etc., and cutting off the output signal of the corresponding counter. Since the left-hand bit of register 520, corresponding to the lowest frequency $f_1$, is always maintained in the ONE state, the lowest frequency counter 530–1 is continuously active and cannot be cut out. Alternately during the increasing cycle wherein a stream of ONES flow, left to right, along the register 520 cutting in higher counters, the register does not recirculate information because of the maintenance of its first position in the ONE state. Consequently, additional ONE signals disappear from the right-hand end of register 520.

In practice, there need not be an actual separation of the plurality of shift code counters as shown in FIGURE 5. They are so shown merely for conceptual reasons. A less complex mechanization is obtained by replacing the plurality of counters within a single long shift code counter and obtaining a plurality of output signals from along its length. The frequency distribution $fc_1$ to $fc_5$ then would be obtained by sampling these bits at appropriate intervals as dictated by the desired code frequency.

Utilization of a single longer code counter, however, requires that it be operated at a sufficiently high rate to insure the presence of entirely new informational bits at successive sampling times and not merely bits which have been slightly shifted in the counter.

The system presented herein results in a band limited coded voice signal. While a certain amount of degradation in the received voice quality is to be expected, the only loss in voice signal reproduction is the absence of hisses and clicks which are normally present as a consequence of the fast rise time of the waveform.

While the present concept has been presented as a device which limits bandwidth, it is alternately useful to achieve a higher degree of scrambling where a greater bandwidth is not objectionable. This increase in scrambling continues until an upper bandwidth frequency limit is reached which is approximately twenty times the highest frequency of the voice signal.

This disclosure has attempted to convey an inventive concept having certain novel characteristics. To satisfactorily do so requires definition, which, unfortunately, is often mistaken for limitation. It is conceivable that numerous variations exist, both as to operational and physical details, from those specified which characteristically retain the basic novelty of the present device.

It is the purpose of the following claims to specify these limiting characteristics and thereby remove any unnecessary limitation which may have been inadvertently imposed in the foregoing description.

What is claimed is:

1. A coded signal communication system comprising an encoding and a decoding subsystem, each of said subsystems including a code generator and means connected to said code generator for controlling the frequency spectrum of the output signal therefrom, the frequency spectrum controlling means of both the encoding and decoding subsystems includes a modulator with input and output terminals to receive and deliver the uncoded and encoded signals respectively, a code generator having coded output signal terminals also connected to the input terminals of said modulator, said code generator also having output signal frequency spectrum control terminals, said encoder further including a frequency monitor and threshold means having frequency selective input means and threshold indicating output means, said selective input means connected to said modulator output terminals and said threshold indicating output means connected to the control terminals of said code generator whereby the spectra of the code generator output means is controllably responsive to selective frequency components of said modulator encoded output signal.

2. The system as set forth in claim 1 wherein the decoding subsystem also includes a comparing means having a first and a second pair of input terminals and a pair of output terminals, said first pair of input terminals to receive the encoded signal to be decoded and said second pair of input terminals connected to the modulator output terminals, said comparing means output terminals connected to the input terminals of said modulator whereby the encoded signal is compared with an identically encoded version of itself to thereby cause removal of said encoding by signal cancellation.

3. A band limited signal decoding system having a synchronized signal encoding means comprising a comparator having a first and a second pair of input terminals, and a pair of output terminals, a modulator having input and output terminals connected between said pair of output and said second pair of input terminals, respectively, of said comparator, a code generator also connected to said modulator input terminals, a frequency spectrum control means controlling said code generator, the input to said control means also connected to said output terminals of said modulator, said modulator forming a primary feedback signal path for said comparator and said code generator with its spectrum control means forming a secondary feedback signal path for said modulator, said primary and secondary feedback paths having alternate signal directions whereby a signal corresponding to the encoding signal is internally created by and compared with said received encoded signal, said comparison of correspondingly encoded signals thereby cancelling said coding.

4. A coded voice communication system comprising an encoding subsystem and a decoding subsystem, said encoding subsystem including an automatic gain control means connected to an information signal source, said gain control means coupled to the input of a modulator having input and output terminals, an encoder code generator having an output signal with a controllable frequency spectrum connected to the input terminals of said modulator with said gain control means, a control means connected to and operative upon said code generator, said control means connected for activation to the output terminals of said modulator, said decoding subsystem of said coded voice communication system comprising a gain control means connected to a coded voice source, a comparator circuit having first and second sets of input terminals and a set of output terminals, said first set of input terminals connected to said gain control means of the decoder, a comparator feedback modulator circuit having input terminals connected to the output terminals of said comparator, said modulator circuit having output terminals connected to the second set of input terminals of said comparator, a decoder code generator, synchronously operated with said encoder code generator, connected to the input terminals of said modulator circuit, a modulator feedback code control circuit connected between the output terminals of said modulator circuit and said decoder code generator, said modulator feedback code control circuit enabling said modulator circuit to apply as comparator feedback at its second set of input terminals, a substantially identically encoded signal as applied at its first set of input terminals, whereby the coding applied to said information signal by said encoding subsystem is substantially cancelled by said decoding subsystem to reproduce at the output of said decoder a signal closely approximating said information input signal.

5. A code generating means for the secure encoding of an information signal comprising a plurality of binary counting means connected to and operated at progressively higher counting rates by a synchronous reference frequency source, said plurality of counting means connected to a corresponding plurality of output control gating means, said plurality of control means connected by a common signal mixing network to a filtering means, said plurality of output control gating means connected for progressive activation or de-activation to a bidirectional shifting control device whereby the binary output signals of said plurality of counters may be progressively included in or excluded from said common signal mixing network.

6. The code generating means as set forth in claim 5 wherein said bidirectional shifting control device is multi-location shift register having shift left and shift-right control means to progressively enable or disable the locations of said register.

7. A code generating means having an output signal of controllable frequency spectrum comprising a plurality of binary counting means of progressively higher repetition rates, each of said counting means respectively connected to and continuously operated under the control of one of a corresponding plurality of, progressively-higher reference frequency signal sources interconnected for synchronous operation therebetween, each of said counting means respectively connected to a gating means, each of said respective gating means resistively connected to a common input terminal of a band pass filter, a common bidirectional shift register having a plurality of locations correspondingly connected to the plurality of gating means to progressively activate and de-activate said gating means to correspondingly include or exclude the binary coded output signals of said counting means.

8. The code generating system as set forth in claim 7 wherein the progressive activation and de-activation of said bidirectional shift register is gate controlled by the highest reference frequency source.

9. A code generating means having an output signal of controllable frequency spectrum comprising a binary counter connected to and continuously operated under the control of a reference frequency source, selected locations of said binary counter connected to gating means, said gating means connected for progressive activation or inactivation to a bidirectional shift control means, each of said gating means resistively coupled to the common input terminal of a filtering means whereby the binary information of the activated selected locations of the binary counter are resistively combined into a single complex signal.

References Cited

UNITED STATES PATENTS

| | | | |
|---|---|---|---|
| 2,896,071 | 7/1959 | Druz | 325—32 |
| 3,092,735 | 6/1963 | Ricketts | 307—88.5 |
| 3,123,672 | 3/1964 | Ross | 179—1.5 |

KATHLEEN H. CLAFFY, *Primary Examiner.*

R. P. TAYLOR, *Assistant Examiner.*